J.J.Wharam
M.Joranovich
INVENTORS

Nov. 30, 1948.  J. J. WHARAM ET AL  2,455,204
CONCENTRIC STEERING COLUMN GEARSHIFT
OPERATING MECHANISM

Filed Oct. 19, 1945

J. J. Wharam
M. Jovanovich
INVENTORS
BY Edwin C. McRae
R. C. Farris
Attorneys.

Patented Nov. 30, 1948

2,455,204

UNITED STATES PATENT OFFICE 2,455,204

CONCENTRIC STEERING COLUMN GEAR-SHIFT OPERATING MECHANISM

John J. Wharam, Dearborn, and Milton Jovanovich, Detroit, Mich., assignors to Ford Motor Company, Dearborn, Mich., a corporation of Delaware Application October 19, 1945, Serial No. 623,248

9 Claims. (Cl. 74—484)

This invention relates to the construction of steering column gearshift controls for automotive vehicles; and, more particularly, to steering column gearshift controls of the type in which the shifting shaft is in the form of a tube arranged concentrically exteriorly of the steering column of the motor vehicle.

Attention is first directed to the copending application filed October 19, 1945, for Concentric steering column gearshift Serial No. 623,246, now Patent No. 2,455,179 dated Nov. 30, 1948, in which the advantages of this type of construction are fully outlined and the entire assembly, as applied to a motor vehicle, is shown in full. The present application is directed to the operating mechanism for such a control: that is, the upper end construction including the lever operated by the driver of the motor vehicle to effect the necessary movement of the shifting shaft or tube to obtain the desired selection in the transmission. The construction of the transmission itself forms no part of this invention, since it follows the usual design; and the other elements making up the complete gearshifting assembly are more fully described in the application first referred to and in the other applications filed October 19, 1945, directed to a Concentric steering column gearshift clutch construction Serial No. 623,247 and a Concentric steering column gearshift support construction Serial No. 623,222 now Patent No. 2,420,333, dated May 13, 1947

While the general advantages of this type of steering column gearshift are described at length in the principle application, the structure has particular advantages so far as the operating mechanism itself is concerned. The phrase, "operating mechanism," is used as referring to the upper end of the steering column and the control assembly and the operating lever which normally extends outwardly beneath the steering wheel on the right side of the steering column and which is manipulated by the driver to shift the transmission of the vehicle to the desired speed ratios. In the ordinary type of steering column gearshift this operating lever must be mounted on a pivot and a fulcrum point must also be provided to obtain the necessary leverage, both of which are usually exposed. Under these circumstances, it is extremely difficult to accord any satisfactory decorative treatment to these elements and it is particularly hard to provide for adequate lubrication of them in their exposed condition. If they are lubricated, leakage commonly is known to soil the driver's attire; and in the best of circumstances they afford a place for the accumulation of dirt which is extremely difficult to remove.

Another disadvantage of the operating mechanism for the separate shaft type of steering column gearshift is that they are, unless very carefully constructed, likely to become noisy and loose with continued wear. Still another disadvantage is that most constructions of that type which have been found to be satisfactory are relatively expensive, and present certain difficulties in assembly which apear to be unavoidable.

The advantage of the present construction is that the device is extremely economical to manufacture and may be made almost exclusively either from stampings or from structural elements of a standard section. Indeed, in the specific example shown, there is but one forging—the operating lever, and but one casting—the bracket itself. All the other items going to make up the assembly are either stampings or standard procurement items. This type of construction results in a large saving from material alone and when these economies are obtained without any sacrifice either in operating ease and efficiency or durability, construction is indeed most desirable.

A further advantage of the particular construction shown is that the operating mechanism is supported directly on the steering column rather than through the interposition of a fixed means at the top of the steering column which has heretofore been necessary with the other types of gearshift controls. This means that the movable steering column hub as a unit may be attached directly to the steering shaft and function not only as a central member of the steering wheel but also as the top closure member for the steering column and the tube of the gearshift control. A further advantage of the invention is that the steering hub, so constructed, conceals the upper edge of the operating shaft completely in all of its various positions of operation so that as far as outward appearance is concerned, the entire assembly appears to be structurally integral. Another advantage of the construction shown is the fact that the device may be readily assembled and is equally easy to disassemble, should service ever be required. Yet another advantage is that, due to the specific formation of the bracket and the operating lever pivoted in it, it is possible to so distribute the load over the component elements that the device is easily operated and excessive wear is avoided.

Other advantages will be apparent from a full description of the invention which is set forth in this specification, claimed in the following claims, and shown in the drawings, in which:

Figure 3:
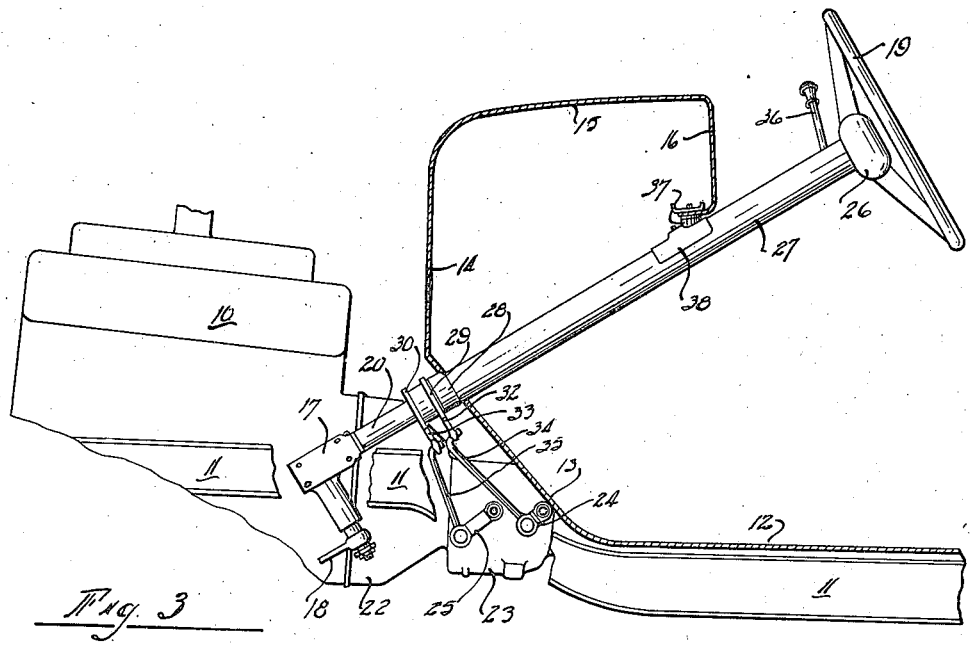
Figure 3 is a longitudinal transverse section through the forward portion of a motor vehicle showing, generally, the relationship of the various elements making up this invention.
Figure 4:
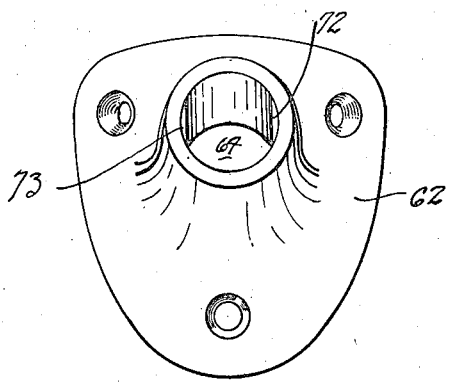
Figure 4 is a front view of the operating bracket normally attached to the operating shaft.

Referring first to Figure 3, 10 indicates the motor of an automobile having a frame 11 (broken away in part) supporting the usual body, the only portion of which is indicated by the section taken through the floor 12, toeboard 13, dashboard 14, cowl 15 and instrument panel 16. The usual steering gear 17 is fixedly secured to the frame 11 and has the steering arm 18 controlled by the rotation of the steering wheel 19, which is rotatably supported on the fixed steering column 20. The engine terminates in the clutch housing 22 and the transmission 23 selectively controlled by the two external transmission operating levers 24 and 25. One of these levers controls the selection between reverse and low speeds and the other, the selection between second and third speeds. As is customary, an interlocking device is provided within the transmission so that but one of these ratios may be selected at any one time.

The steering wheel 19 has a hub 26 which encloses the upper end of the operating tube 27 which, in turn, is rotatably and reciprocably mounted on the steering column 20 and terminates at its lower end in a clutching device 28, selectively operating one or the other of two collars 29 and 30 terminating in the arms 32 and 33 which are attached by the links 34 and 35 to the transmission operating levers 24 and 25. The operating lever 36 for the tube 27 is pivotally mounted on the steering column immediately beneath the hub 26 in a convenient position to be grasped by the driver of the motor vehicle. The steering column 20 is further supported intermediate the hub and the steering gear by a bracket 37 affixed to the instrument panel 16 and extending through a slot in the outer tube 27 which is normally covered by the skirt 38 which forms an integral part of the bracket 37.

Figure 1:
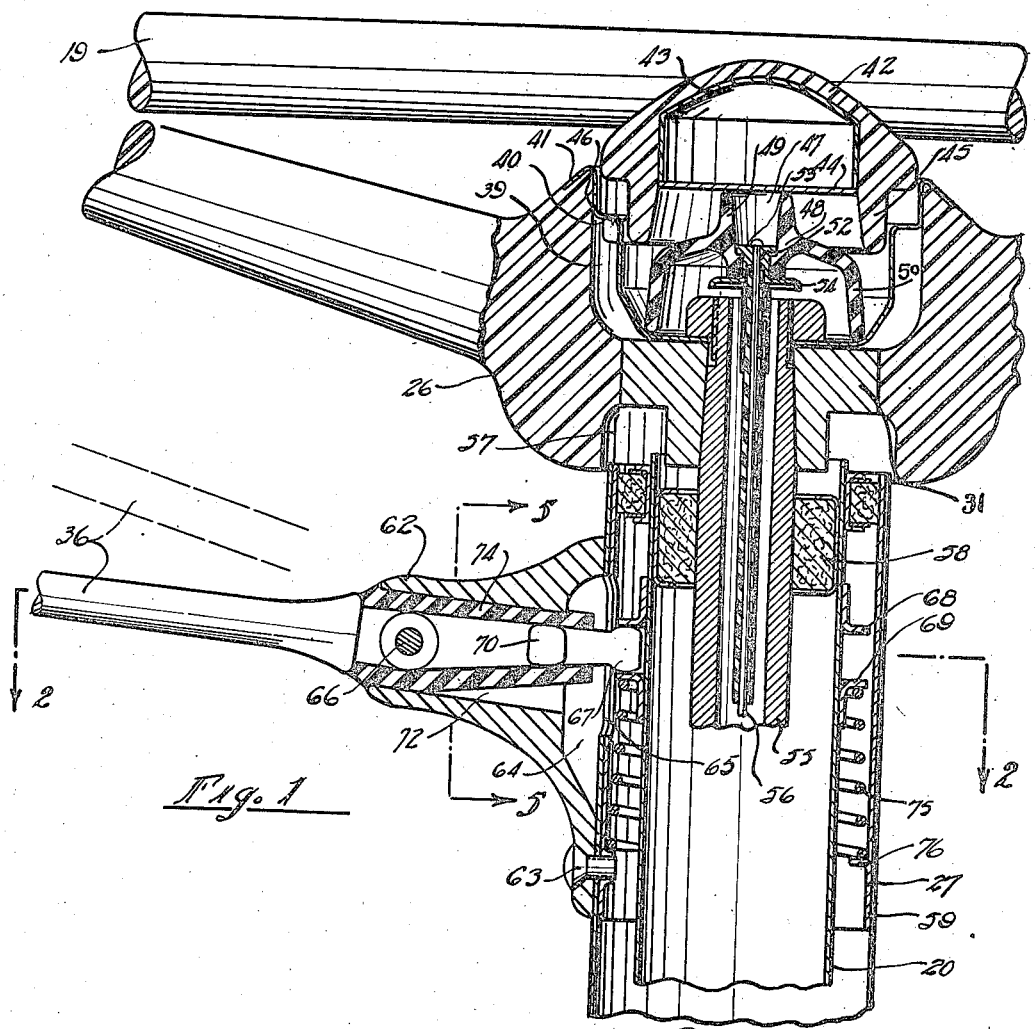
Figure 1 is a transverse vertical section through the upper end of the steering column and the steering wheel assembly showing the operating mechanism for the steering column gearshift control.
Figure 2:
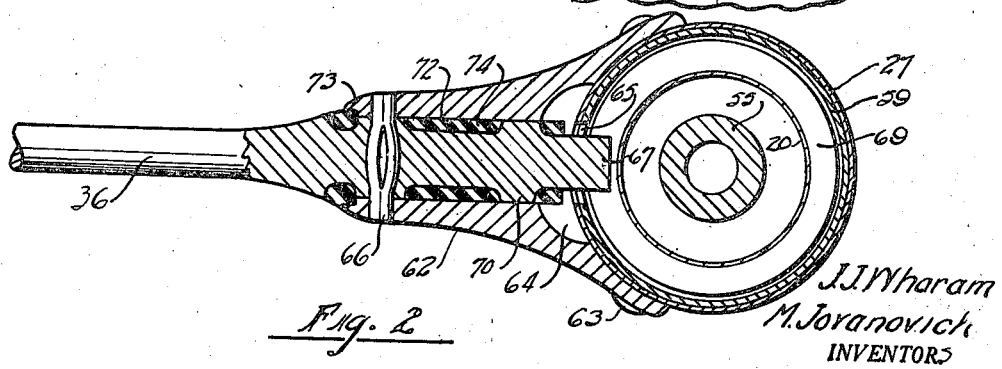
Figure 2 is a horizontal transverse section taken substantially as indicated on the line 2—2 of Figure 1.

Reference is now made to Figures 1 and 2, showing in detail the construction of the upper end of the steering column assembly. It will be noted that the hub 26 has an upwardly opening central depression 39 in which is seated a dished metal lining 40 having the flanges 41 extending around the edge of the depression protecting them against breaking up and serving as a decorative frame for the horn button 42 which is reciprocably received within the lining 40. The button is preferably made from a transparent plastic material having a contrasting inner lining 43 and is fitted with an inner metal diaphragm 44. The depending flange 45 serves to keep it centered within the lining 40. The lower edge of the flange 45 is provided with several radially outwardly extending lugs 46 which are received in bayonet slots in the lining 40 restraining the outward movement of the horn button 42 but permitting its depression relative to the hub 26. It is normally, however, urged outwardly by the resiliency of the rubber spring unit 47 which has a central hub 48 from which a substantially cylindrical extension projects upwardly to the diaphragm 44 and a flared skirt 50 extending outwardly and downwardly and seated in the bottom of the lining 40. A metal contact member 52 is snapped into the hole in the central hub 48 and is retained there by the upper flange 53 and the lower or contact flange 54 normally spaced slightly above the top of the steering shaft 55. The conformation of the spring unit 47 is so chosen that the horn button is first compressed against the resiliency of the flared skirt 50 of the rubber spring unit 47 until the flange 54 comes in contact with the steering shaft 55. Thereafter, any further depression of the horn button is taken care of by the resiliency of the cylindrical extension 49. The resistance of this latter element is much greater than that of the skirt 50, so that the downward movement of the horn button under ordinary pressure then ceases. However, when it is desired to compress the button still further in assembly or disassembly, as when the lugs 46 are to be engaged in or disengaged from the bayonet slots in the lining 40, the resiliency of the cylindrical extension 49 permits this further depression if sufficient force is applied, without interfering with the subsequent normal operation of the horn button. A horn cable 56 extending through the center of the steering shaft 55 and electrically connected to the contact member 52 completes this electrical assembly.

It will be noted that the steering column 20 encloses the steering shaft 55 which is fixed for rotation with the central member 31 of the hub 26 and that its upper end terminates within a circumferential recess 57 on the lower surface of the hub 26. A fabric bearing 58 pressed into the upper end of the steering column 20 permits free rotation of the shaft 55 with respect to the steering column 20. The upper end of the operating tube 27 is provided with an internal reinforcing tube 59 and this assembly is rotatably and reciprocably supported with respect to the steering column 20 by the fabric bearing 60 immediately adjacent the top of the steering column.

Figure 5:
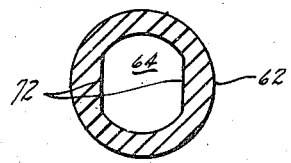
Figure 5 is a vertical transverse section through the bracket taken substantially as indicated on the line 5—5 of Figure 1.

A bracket 62, which in this instance may be made of a die casting, is fixed to the outer surface of the tube 27 by means of the screws 63 and has a central opening 64 aligned with an opening 65 in the tubes 27 and 59. The operating lever 36 is pivoted on the pin 66 adjacent the outer end of the bracket 62 and extends inwardly through the openings 64 and 65 to terminate in the head 67 which is seated in the channel formed by the two spaced angular rings 68 and 69 secured to the outer surface of the steering column 20. The operating lever 36 is provided with a fulcrum boss 70 on each side thereof spaced inwardly of the pin 66 and adapted to engage slidably the flattened vertical walls 72 of the opening 64 (see Figure 5). The outer end of the bracket 62 is counterbored at 73 and the inner end of the operating lever 36 is surrounded with a flexible rubber bushing 74 which fits rather tightly between the side walls of the opening 64 and is resiliently deformed thereby and cushions the movement of the lever. A spring 75 seated between the lower angular ring 69 and the ears 76 struck out adjacent the lower end of the internal reinforcing tube 59 normally urges the tube 27 downwardly with respect to the steering column 20 to the position shown in Figure 1, from which it may be raised by operation of the lever 36 to the position shown in dotted line.

The operation of the device is believed to be quite clear from the foregoing. Starting from the position shown in Figure 1, the operating lever 36 may be rotated about the longitudinal axis of the steering column to rotate the tube 27 in its lowermost position or it may first be raised to the position indicated in dotted line. This also raises the tube 27 so that its upper end projects much further into the recess 57 in the hub 26. The lever 36 may then be rotated about the column axis to rotate the tube in its uppermost position. This combined reciprocation and rotation of the tube actuates a suitable clutching device at the bottom of the column which is fully described in the applications referred to above and will not be elaborated upon here. A most important point is that the fulcrum bosses 70 on the operating lever 36 co-operating with the walls 72 of the bracket 62 permit the lever and bracket to operate as a unit during rotation in either position of reciprocation while the head 67 of the lever travels circumferentially around the channel formed by the rings 68 and 69. However, this arrangement does not impede the vertical movement of the lever as the channel formed by the rings 68 and 69 serves also as a vertical fulcrum point, and the entire bracket, lever and tube assembly may be raised as a unit about it. Both the reciprocating and rotational movement of the lever is effected effortlessly, and it will be noted that all of the internal structure of the device is completely enclosed either by the hub 26 or the bracket 62 in any of the various positions which may be assumed by the element in effecting the various shifts. The construction of the steering column is very economical, since the only requisite is that some sort of channel be formed at least partially around its exterior surface to receive the head 67 of the operating lever 36. The device is extremely easy to assemble since one tube need only be slipped over the other and is held in the desired axial relationship by the fabric bushing supplied and is centered longitudinally by a spring which is simply inserted between the lower edge of the channel and suitable ears struck out on the reinforcing sleeve. The bracket itself may be diecast and will be of adequate strength, since the major loads are imposed during rotation when the fulcrum bosses provided on the operating lever are operative to distribute this load very effectively and there is no danger of damaging the bracket at any time. The entire bracket may be readily removed by removal of the screws, should this ever be necessary, and an entire new bracket, lever and bushing may be replaced as a unit, if desired.

Thus, the resultant structure is very neat in appearance, is entirely enclosed so far as appearance and protection against leakage of lubricants are concerned, is economical to manufacture, may be readily assembled and disassembled, and is extremely easy to operate—the fact which is most important since the force sometimes required to shift gears, particularly in cold weather, is quite considerable.

It is realized that certain changes may be made in the details of the construction shown and described herein, but it is the intention to cover by the claims all such changes which are reasonably within the scope thereof.

The invention claimed is:

1. In an operating mechanism for a steering column gearshift employing a concentric operating member reciprocably and rotatably mounted exteriorly of the column, comprising a steering column, an operating member, an extending bracket on said member, an operating lever pivoted on said bracket and having an inner end slidably received in a channel fixed with respect to said column and extending circumferentially normal to the longitudinal axis thereof.

2. In an operating mechanism for a steering column gearshift employing a concentric operating tube reciprocably and rotatably mounted exteriorly of the column, comprising a steering column, an operating tube, a bracket extending from one side of said tube, an operating lever pivoted intermediate its end in said bracket and having an inner end extending through an opening in said tube and slidably received in a channel fixed with respect to said column and extending circumferentially normal to the longitudinal axis thereof.

3. In an operating mechanism for a steering column gearshift employing a concentric operating tube reciprocably and rotatably mounted exteriorly of the column, comprising a steering column, an operating tube, an opening in the side of said tube, a bracket enclosing said opening and extending outwardly from said tube, an operating lever pivoted intermediate its ends adjacent the outer end of said bracket and having an inner end passing through said bracket and said opening and slidably received in a channel fixed with respect to said column and extending circumferentially normal to the longitudinal axis thereof.

4. In an operating mechanism for a steering column gearshift employing a concentric operating tube reciprocably and rotatably mounted exteriorly of said column, comprising a steering column, an operating tube, a steering wheel rotatably mounted on said column and having a circumferential recess in its lower surface enclosing the top of said column and slidably receiving the upper edge of said tube, an opening in the side of said tube, a bracket removably secured to said tube enclosing said opening, an operating lever pivoted intermediate its ends to said bracket adjacent its outer end and extending inwardly through said bracket and said opening and its inner end slidably received in a channel fixed with respect to said column and extending circumferentially normal to the longitudinal axis thereof.

5. In an operating mechanism for a steering column gearshift employing a concentric operating tube reciprocably and rotatably mounted exteriorly of the column, comprising a steering column, an operating tube, an extending bracket on one side of said tube having an axial bore, an operating lever transversely pivoted intermediate its ends adjacent the outer end of said bracket, the inner end of said lever having a transverse boss spaced a substantial distance inwardly of said point of pivotal attachment, the axial bore of said bracket having a flattened vertical side slidably receiving the face of said boss to provide free rotation of said lever relative to said bracket about said pivot while restraining said bracket and lever for common rotation in planes normal thereto.

6. A structure of claim 5 which is further characterized in that at least a portion of said lever extending outwardly from said boss is surrounded by a resilient bushing resiliently deformed between the flattened side of said bore and said lever.

7. In an operating mechanism for a steering column gearshift employing a concentric operating tube reciprocably and rotatably mounted exteriorly of the column, comprising a steering column, an operating tube, an extending bracket on one side of said tube having an axial bore, an operating lever transversely pivoted intermediate its ends adjacent the outer end of said bracket, the inner end of said lever having a pair of opposed transversely extended bosses spaced a substantial distance inwardly of said point of pivoted attachment of said lever, the axial bore of said bracket having flattened vertical sides slidably receiving the respective outer faces of said bosses to provide free rotation of said lever relative to said bracket about said transverse pivot while restraining said bracket and lever for common rotation in planes normal thereto, and a resilient bushing surrounding said lever at least between said transverse pivot and said bosses and resiliently engaging the flattened vertical sides of said bore.

8. The structure of claim 7 which is further characterized in that spring means between said tube and said column normally urge said tube into one position of reciprocation.

9. In a lever construction having particular application to the operation of automotive transmission controls, a bracket having a base, a bore extending through said bracket from said base, said bore having a pair of opposed flattened sides, a pin supported in said bracket remote from said base and extending across said bore normal to said sides, a lever extending through said bore and pivotally supported on said pin, said lever having opposed extending bosses having their outer faces slidable on said respective flattened sides between said pin and said base, said lever being surrounded by a sleeve of resilient material at least between said pin and said bosses, said sleeve resiliently engaging said sides and cushioning said lever.

JOHN J. WHARAM.
MILTON JOVANOVICH.

REFERENCES CITED

The following references are of record in the file of this patent:

UNITED STATES PATENTS

| Number | Name | Date |
| --- | --- | --- |
| 1,425,227 | Woodward | Aug. 8, 1922 |
| 1,515,236 | Woodward | Nov. 11, 1924 |
| 1,815,871 | Douglas | July 21, 1931 |
| 2,317,654 | Wharam | Apr. 27, 1943 |